June 2, 1970            J. BRITT            3,514,943

LUBRICATION SYSTEM FOR A BEARING

Filed Oct. 19, 1967

Inventor
Jack Britt

By Mawhinney &
Mawhinney
Attorney

United States Patent Office 3,514,943
Patented June 2, 1970

---

3,514,943
LUBRICATION SYSTEM FOR A BEARING
Jack Britt, Ambergate, Derby, England, assignor to Rolls-Royce Limited, Derby, England, a British company
Filed Oct. 19, 1967, Ser. No. 676,435
Claims priority, application Great Britain, Nov. 17, 1966, 51,597/66
Int. Cl. F02c 7/06; F16n 7/18
U.S. Cl. 60—39.08                                  4 Claims

---

ABSTRACT OF THE DISCLOSURE

The high pressure shaft of a two shaft gas turbine engine is mounted within a bearing which is lubricated by oil which is moved towards the bearing by helical grooves on the low pressure shaft.

---

This invention relates to lubrication systems for bearings.

According to the present invention there is provided apparatus comprising a hollow rotatable first shaft, a second shaft disposed within and spaced from said first shaft, a bearing within which the first shaft is supported, two sets of helical grooves of opposite hand axially separated on one of said shafts, the first and second shafts and the two sets of helical grooves being so disposed to define a space therebetween, at least one lubricant duct extending through the first shaft from said space to the bearing, and means for feeding lubricant between the first and second shafts whereby rotation of the said one of the shafts causes the two sets of helical grooves to rotate whereby lubricant is moved by one set of helical grooves to said space and is prevented from moving axially from said space by the other set of helical grooves, the lubricant passing to the bearing through said duct.

By means of the present invention the supply of lubricant to the bearing is effected at least in part by the rotation of the shafts. Thus to some extent the lubricant supply is made to vary with the rotational speed of the shafts.

In the preferred embodiment of the invention, each screw feed device is mounted on a rotatable shaft which extends coaxially within the first shaft.

The invention is particularly applicable to the lubrication of bearings in gas turbine engines. Thus according to a preferred embodiment of the invention said first shaft is a turbine shaft of a gas turbine engine, the first and second shafts are respectively the low and high pressure turbine shafts of a twin-shaft gas turbine engine.

Figure 1:
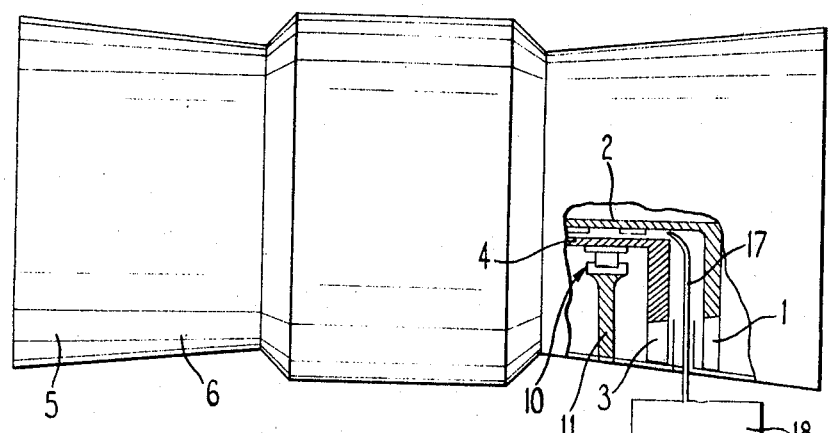
Figure 2:
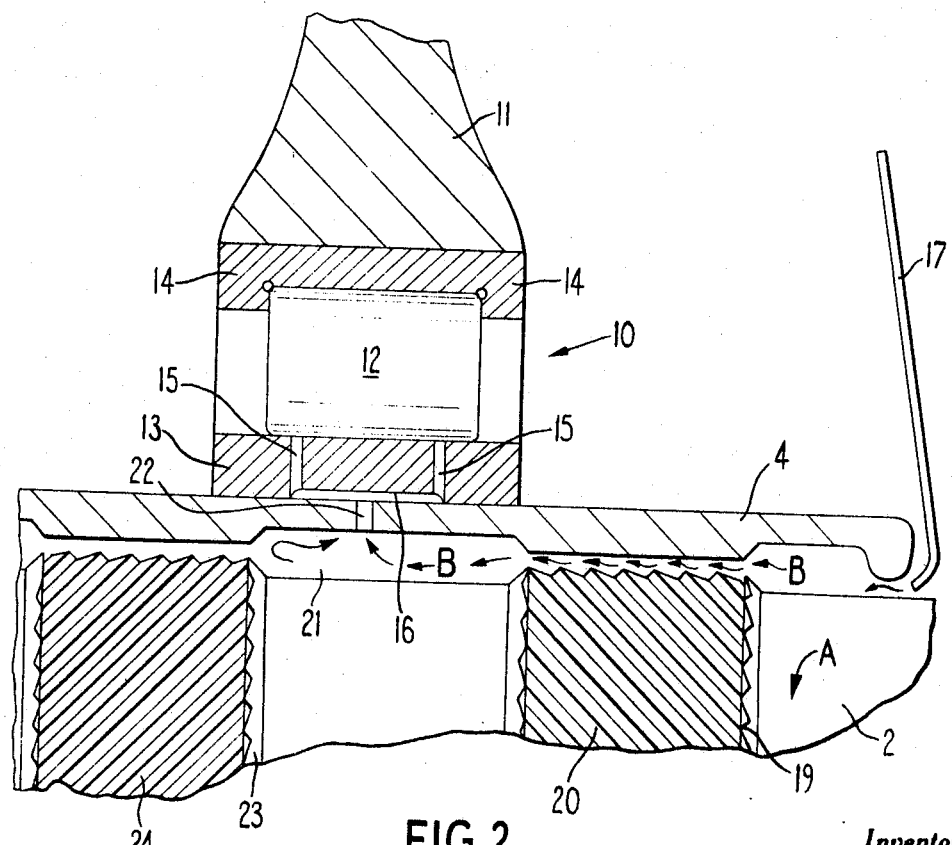

The invention will be described, merely by way of example, with reference to the accompanying drawings, in which:

FIG. 1 is a diagrammatic side elevation of a gas turbine engine, partly shown in section, and FIG. 2 is a diagrammatic partial section through a bearing employed in the engine of FIG. 1, incorporating a lubrication system in accordance with the invention.

The gas turbine engine shown in FIG. 1 is of a conventional twin-shaft type, comprising a low pressure turbine 1 mounted on a low pressure shaft 2 and a high pressure turbine 3 mounted on a high pressure shaft 4 which surrounds and is coaxial with the low pressure shaft 2. The low and high pressure shafts 2, 4 drive respective low and high pressure compressors, indicated diagrammatically at 5, 6 respectively.

The shafts 2, 4 are supported in a number of bearings, one of which is shown diagrammatically in FIG. 1 at 10 and comprises a roller bearing which supports the outer (high pressure) shaft 4 from fixed engine structure 11 (FIG. 2).

Referring to FIG. 2 the roller bearing 10 comprises a plurality of rollers 12 disposed between an inner race 13 and an outer race 14, the inner race 13 being secured to the shaft 4 and the outer race 14 being secured to the fixed structure 11.

The bearing inner race 13 is provided with radially extending lubricant supply channels 15 which communicate with the surface of the inner race 13 on which the rollers 12 pass and which are adapted to be supplied with lubricant from an annular supply duct 16 at the radially inner end of the bearing race 13.

Lubricant is supplied to the bearing 10 by way of a lubricant supply pipe 17 extending from a lubricant supply pump 18, shown diagrammatically in FIG. 1. The supply pipe 17 is arranged (FIG. 2) to inject lubricant between the inner shaft 2 and the outer shaft 4.

A first screw feed device 19 is provided on the inner shaft 2 and spaced a short distance axially from the mouth of the lubricant supply pipe 17. The screw feed device 19 comprises a circumferential land secured to or integral with the inner shaft 2, the surface of the land being formed with a plurality of parallel helical grooves 20 of V-shaped cross-section. The grooves 20 are so arranged that, on rotation of the shaft 2 in its normal direction in operation of the engine, as indicated by arrow A, the rotation of the screw feed device 19 causes lubricant to be moved axially between the shafts 2 and 4 away from the lubricant supply pipe 17 in the direction indicated by arrows B.

In this way lubricant is supplied to an annular space 21 provided between the shafts 2, 4 and disposed radially inwardly of the bearing 10. The space 21 communicates with the lubricant supply duct 16 by way of radial drillings 22 in the outer shaft 4, so that lubricant flows through drillings 22, the supply duct 16, and the channels 15 to the bearing 10.

A further screw feed device 23 is mounted on the inner shaft 2 and spaced axially from the first screw feed device 19, the two screw feed devices 19, 23 being separated axially by the space 21. The further screw feed device 23 is formed in a similar manner to the screw feed device 19 with a plurality of parallel helical grooves 24. The helical grooves 24 are, however, of opposite hand to the grooves 20, so that, when the shaft rotates in the direction of arrow A, lubricant is moved axially in a direction opposite to that in which lubricant is moved by the first screw feed device 19. Thus the further screw feed device 23 serves to prevent lubricant from flowing between the shafts 2, 4 beyond the space 21.

After flowing through the bearing 10, lubricant is scavenged and returned to the lubricant supply pump 18 by any convenient known means, not shown.

It will be appreciated that the screw feed devices 19, 23 could be alternatively provided on the internal surface of the outer (high pressure) shaft 4 rather than on the external surface of the inner (low pressure) shaft 2.

I claim:

1. Apparatus comprising a hollow rotatable first shaft, a second shaft disposed within and spaced from said first shaft, a bearing within which the first shaft is supported, two sets of helical grooves of opposite hand axially separated on one of said shafts, the first and second shafts and the two sets of helical grooves being so disposed to define a space therebetween, at least one lubricant duct extending through the first shaft from said space to the bearing, and means for feeding lubricant between the first and second shafts whereby rotation of the said one of the shafts causes the two sets of helical grooves to rotate whereby lubricant is moved by one set of helical grooves to said space and is prevented from moving from said space by the other set of helical grooves the lubricant passing to the bearing through said duct.

2. Lubrication system according to claim 1 in which the said first shaft is a turbine shaft of a gas turbine engine.

3. Lubrication system according to claim 1 in which the two sets of helical grooves are on the second shaft.

4. Lubrication system according to claim 3 in which the first and second shafts are respectively the low and high pressure turbine shafts of a twin-shaft gas turbine engine.

References Cited

UNITED STATES PATENTS

| | | | |
|---|---|---|---|
| 832,877 | 10/1906 | Richards | 308—127 XR |
| 1,408,837 | 3/1922 | Sobolewski | 308—127 XR |
| 1,508,085 | 9/1924 | Cooper | 308—127 |
| 2,226,622 | 12/1940 | Lignian | 308—127 |
| 2,791,090 | 5/1957 | Hooker | 60—39.08 |
| 2,911,267 | 11/1959 | Small. | |
| 3,179,478 | 4/1965 | Readdy | 308—187 |

FOREIGN PATENTS 39,847    9/1911    Sweden.

ROBERT A. O'LEARY, Primary Examiner

M. A. ANTONAKAS, Assistant Examiner

U.S. Cl. X.R.

184—6; 308—187